United States Patent
Schacherbauer

[11] Patent Number: 6,109,212
[45] Date of Patent: Aug. 29, 2000

[54] ADJUSTABLE CAT LITTER BOX ACCESSORY

[76] Inventor: Josephine Schacherbauer, 24 Laurelton Ave., Selden, N.Y. 11784

[21] Appl. No.: 09/225,142

[22] Filed: Jan. 4, 1999

Related U.S. Application Data

[63] Continuation-in-part of application No. 08/943,016, Oct. 2, 1997, abandoned.

[51] Int. Cl.⁷ .................................................. A01K 1/035
[52] U.S. Cl. ........................................................ 119/165
[58] Field of Search ................................ 119/165, 166, 119/168, 169, 170, 161; D30/161

[56] References Cited

U.S. PATENT DOCUMENTS

| | | | |
|---|---|---|---|
| 5,218,930 | 6/1993 | Casmira | 119/165 |
| 5,220,886 | 6/1993 | Hyde | 119/165 |
| 5,361,725 | 11/1994 | Baillie et al. | 119/165 |
| 5,388,550 | 2/1995 | Noble | 119/165 |
| 5,816,195 | 10/1998 | Flynn | 119/165 |
| 5,992,350 | 11/1999 | Manzo | 119/165 |
| 6,050,223 | 4/2000 | Harris | 119/165 |

*Primary Examiner*—Peter M. Poon
*Assistant Examiner*—Elizabeth Shaw

[57] ABSTRACT

An adjustable cat litter box accessory including a front section comprising a peripheral wall. The peripheral wall forms a rounded closed forward wall and an open rear wall. A rear section is slidably coupled with respect to the open rear wall of the front section. A removable grill is dimensioned for coupling with the front section. A removable collection tray is dimensioned for slidable receipt within an opening in the rounded closed forward wall of the front section. The collection tray is positioned below the removable grill within the front section.

7 Claims, 4 Drawing Sheets

ADJUSTABLE CAT LITTER BOX ACCESSORY

CROSS-REFERENCE TO RELATED APPLICATIONS

This application is a continuation-in-part of application Ser. No. 08/943,016 filed Oct. 2, 1997 now abandoned.

BACKGROUND OF THE INVENTION

1. Field of the Invention

The present invention relates to an adjustable cat litter box accessory and more particularly pertains to removing and collecting excess cat litter from a cat's paws with an adjustable cat litter box accessory.

2. Description of the Prior Art

The use of litter trays is known in the prior art. More specifically, litter trays heretofore devised and utilized for the purpose of containing cat litter are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,220,886 to Hyde; U.S. Pat. No. 5,218,930 to Casmira; U.S. Pat. No. 3,885,523 to Coleman; U.S. Pat. No. 5,195,464 to Mutter; U.S. Pat. No. 5,388,550 to Noble; and U.S. Pat. No. Des. 351,694 to Evans.

While these devices fulfill their respective, particular objective and requirements, the aforementioned patents do not describe an adjustable cat litter box accessory for removing and collecting excess cat litter from a cat's paws.

In this respect, the adjustable cat litter box accessory according to the present invention substantially departs from the conventional concepts and designs of the prior art, and in doing so provides an apparatus primarily developed for the purpose of removing and collecting excess cat litter from a cat's paws.

Therefore, it can be appreciated that there exists a continuing need for new and improved adjustable cat litter box accessory which can be used for removing and collecting excess cat litter from a cat's paws. In this regard, the present invention substantially fulfills this need.

SUMMARY OF THE INVENTION

In the view of the foregoing disadvantages inherent in the known types of litter trays now present in the prior art, the present invention provides an improved adjustable cat litter box accessory. As such, the general purpose of the present invention, which will be described subsequently in greater detail, is to provide a new and improved adjustable cat litter box accessory and method which has all the advantages of the prior art and none of the disadvantages.

To attain this, the present invention essentially comprises a front section comprising a peripheral wall. The peripheral wall forms a rounded closed forward wall and an open rear wall. The rounded closed forward wall has an arcuate slotted opening formed therethrough. The front section further comprises a forward portion and a rearward portion. The forward portion is formed within the rounded closed forward wall and has a closed interior rear wall. The closed interior rear wall has a central opening therethrough. The rearward portion has a platform extending between the closed interior rear wall of the forward portion and the open rear wall. The rearward portion has a pair of lower channels extending inwardly thereof and a pair of side channels extending inwardly thereof. A rear section is slidably coupled with respect to the open rear wall of the front section. The rear section comprises an open front end, a closed rear end, opposed side walls, and a closed bottom. The opposed side walls are slidably received within the pair of side channels of the rearward portion of the front section. The closed bottom has an elevated bifurcated bracket slidably received within the pair of lower channels of the rearward portion of the front section. A removable grill is dimensioned for coupling with the forward portion of the front section. The grill is defined by a plurality of upwardly raising nubs and a plurality of oblong apertures therethrough. The removable grill has a plurality of legs extending from a lower surface thereof for elevating the grill within the forward section. A removable collection tray is dimensioned for slidable receipt within the arcuate slotted opening in the rounded closed forward wall of the front section. The collection tray is positioned below the removable grill within the forward portion of the front section. The collection tray has a handle extending outwardly therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable cat litter box accessory which has all the advantages of the prior art litter trays and none of the disadvantages.

It is another object of the present invention to provide a new and improved adjustable cat litter box accessory which may be easily and efficiently manufactured and marketed.

It is a further object of the present invention to provide a new and improved adjustable cat litter box accessory which is of durable and reliable construction.

An even further object of the present invention is to provide a new and improved adjustable cat litter box accessory which is susceptible of a low cost of manufacture with regard to both materials and labor, and which accordingly is then susceptible of low prices of sale to the consuming public, thereby making such an adjustable cat litter box accessory economically available to the buying public.

Even still another object of the present invention is to provide a new and improved adjustable cat litter box accessory for removing and collecting excess cat litter from a cat's paws.

Lastly, it is an object of the present invention to provide a new and improved adjustable cat litter box accessory including a front section comprising a peripheral wall. The peripheral wall forms a rounded closed forward wall and an open rear wall. A rear section is slidably coupled with respect to the open rear wall of the front section. A removable grill is dimensioned for coupling with the front section. A removable collection tray is dimensioned for slidable receipt within an opening in the rounded closed forward wall of the front section. The collection tray is positioned below the removable grill within the front section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, such description makes reference to the annexed drawings wherein.

The same reference numerals refer to the same parts through the various figures.

DESCRIPTION OF THE PREFERRED EMBODIMENT

Figure 1:
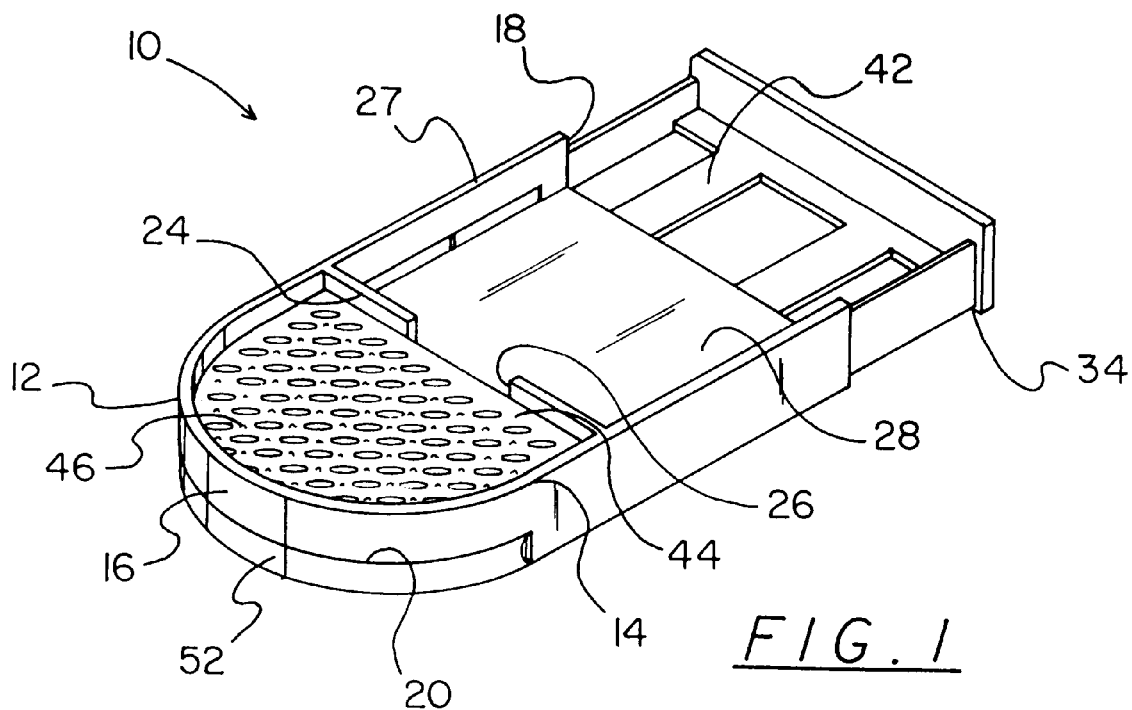
FIG. 1 is a perspective view of the preferred embodiment of the adjustable cat litter box accessory constructed in accordance with the principles of the present invention.
Figure 2:
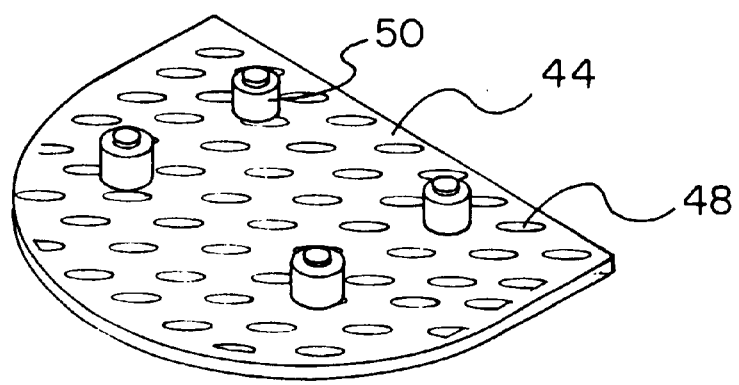
FIG. 2 bottom perspective view of the removable grill of the present invention.
Figure 3:
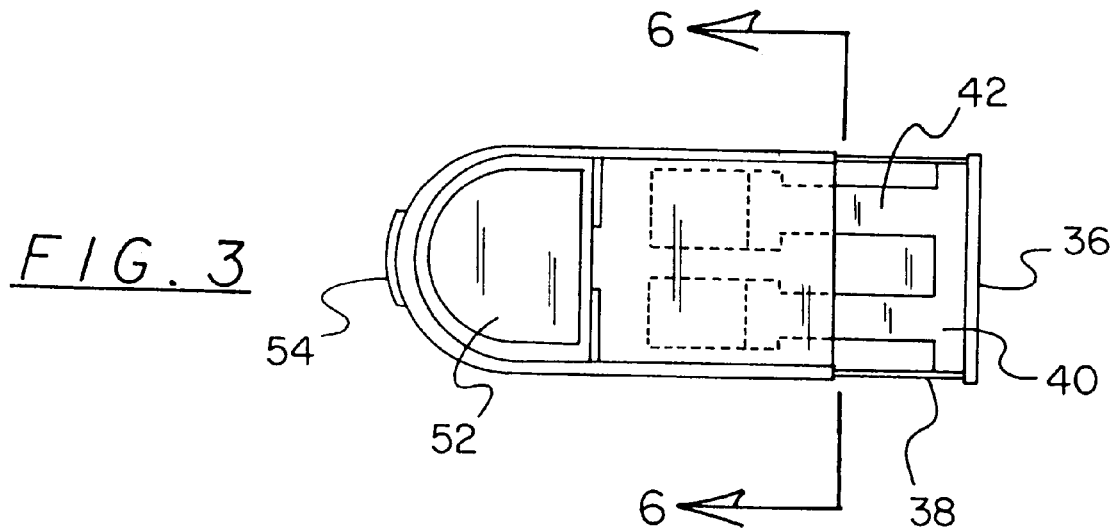
FIG. 3 is top plan view of the present invention illustrated in an extended orientation.
Figure 4:
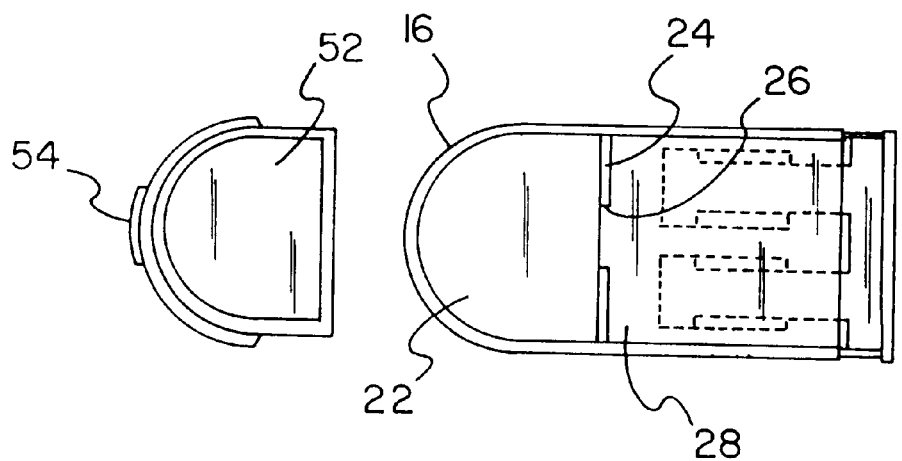
FIG. 4 is top plan view of the present invention illustrating the removable collection tray thereof
Figure 5:
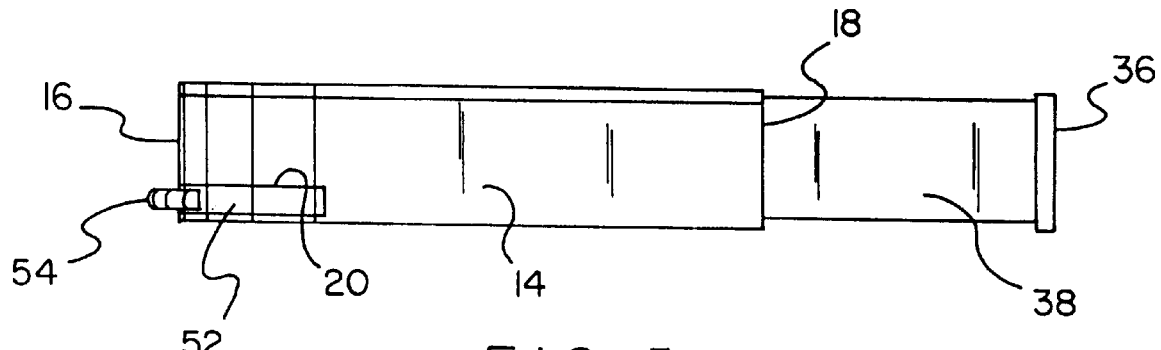
FIG. 5 is a side elevation view of the present invention.
Figure 6:
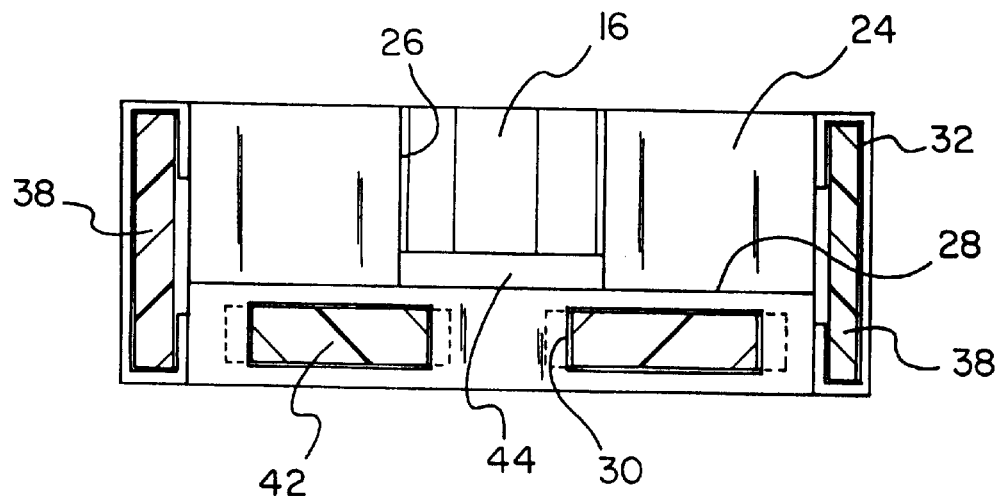
FIG. 6 is cross-sectional view as taken along line 6—6 of FIG. 3.

With reference now to the drawings, and in particular, to FIGS. 1 through 6 thereof, the preferred embodiment of the new and improved adjustable cat litter box accessory embodying the principles and concepts of the present invention and generally designated by the reference number 10 will be described.

Specifically, it will be noted in the various Figures that the device relates to a adjustable cat litter box accessory for removing and collecting excess cat litter from a cat's paws. In its broadest context, the device consists of a front section, a rear section, a removable grill and a removable collection tray. Such components are individually configured and correlated with respect to each other so as to attain the desired objective.

The front section 12 is comprised of a peripheral wall 14. The peripheral wall 14 forms a rounded closed forward wall 16 and an open rear wall 18. The rounded closed forward wall 16 has an arcuate slotted opening 20 formed therethrough. The front section 12 further comprises a forward portion 22 and a rearward portion 24. The forward portion 22 is formed within the rounded closed forward wall 16 and has a closed interior rear wall 24. The closed interior rear wall 24 has a central opening 26 therethrough. The rearward portion 27 has a platform 28 extending between the closed interior rear wall 24 of the forward portion 22 and the open rear wall 18. The rearward portion 27 has a pair of lower channels 30 extending inwardly thereof and a pair of side channels 32 extending inwardly thereof.

The rear section 34 is slidably coupled with respect to the open rear wall 18 of the front section 12. The rear section 34 comprises an open front end, a closed rear end 36, opposed side walls 38, and a closed bottom 40. The opposed side walls 38 are slidably received within the pair of side channels 32 of the rearward portion 27 of the front section 12. The closed bottom 40 has an elevated bifurcated bracket 42 slidably received within the pair of lower channels 30 of the rearward portion 27 of the front section 12.

The removable grill 44 is dimensioned for coupling with the forward portion 22 of the front section 12. The grill 44 is defined by a plurality of upwardly raising nubs 46 and a plurality of oblong apertures 48 therethrough. The removable grill 44 has a plurality of legs 50 extending from a lower surface thereof for elevating the grill 44 within the forward portion 22.

The removable collection tray 52 is dimensioned for slidable receipt within the arcuate slotted opening 20 in the rounded closed forward wall 16 of the front section 12. The collection tray 52 is positioned below the removable grill 44 within the forward portion 22 of the front section 12. The collection tray 52 has a handle 54 extending outwardly therefrom to facilitate removal thereof.

Figure 7:
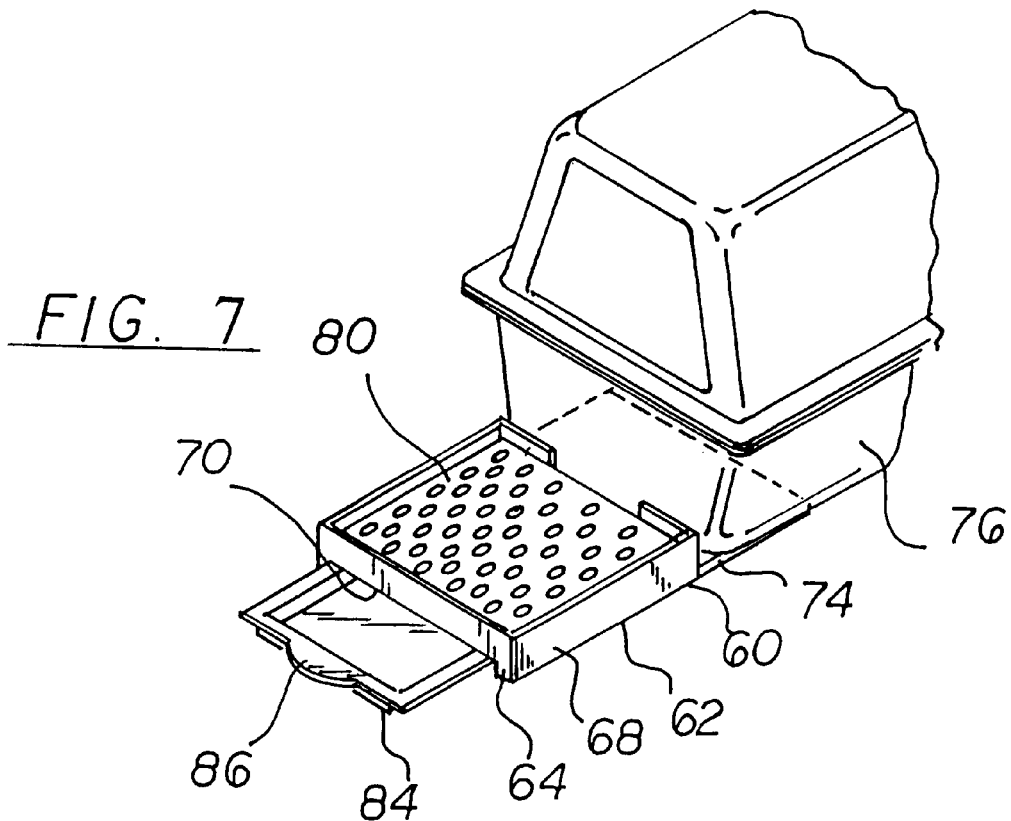
FIG. 7 is a perspective illustration of an alternate embodiment of the invention.
Figure 8:
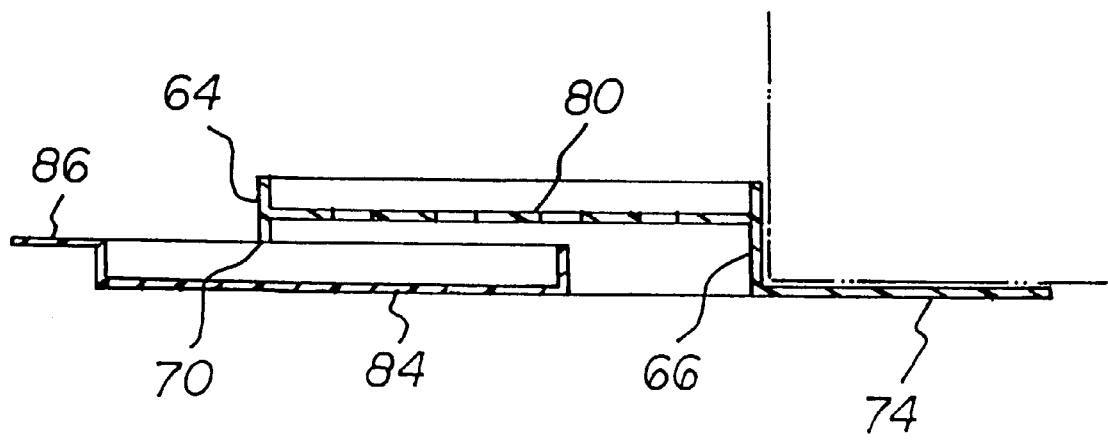
FIG. 8 is a cross-section view taken along line 8—8 of FIG. 7.

Shown in FIGS. 7 and 8 is an alternate embodiment of the invention. Such alternate embodiment is also a cat litter box accessory for removing and collecting excess cat litter from a cat's paws. The accessory 60 of this alternate embodiment includes a front section 62. The front section comprises a peripheral wall. The peripheral wall is formed with a forward wall 64 and a parallel rearward wall 66. It is also formed with parallel side walls 68 at right angles between the forward and rearward walls. The forward wall is constructed to have an opening 70 from the lower surface of the forward wall extending upwardly to a location beneath the upper surface.

Next provided is a rear section 74. Such rear section is a rigid rectangular sheet preferably formed integrally with the lower edge of the rearward wall of the front section. The rear section is adapted to rest beneath the forward section of a kitty litter box 76.

Also provided as a part of the accessory is a grill 80. The grill is of a rigid material with apertures extending therethrough. It is dimensioned to be integrally formed with the front section at an intermediate elevation.

It is preferred that the front section and rear section and grill are integrally formed as a unitary piece of a rigid plastic. It should be understood, however, that the grill is preferably integrally formed with the remainder of the front section, but it may be separately formed and removably positioned within the front section. Similarly, the rear section could be separably fabricated from the front section and separately attached thereto.

Lastly provided is a removable collection tray 84 with a handle 86. A commercially available plastic kitty litter tray could be used for these purposes. Such tray, preferably fabricated of plastic, is dimensioned for being slidably received within the opening in the forward wall of the front section. Such tray may also be withdrawn for the removal of litter therefrom. It is preferred, however, that the collection tray be positioned and retained below the grill within the front section during normal operation and use.

The present invention is a litter box accessory designed to remove and collect excess litter from a cat's paws, keeping surrounding floors clean and the cat's paws healthy. The present invention is an adjustable length, two-sectioned plastic tray to be placed underneath an existing litter box. The front section 12 contains a removable grill 44 having raised nubs 46 to knock litter from the cat's paws, and apertures 48 for the litter to fall through to removable collection tray 52 immediately below. The grill 44 features legs 50 on its lower surface to keep it sturdy for cats of any size. The rear section 34 of the present invention is adjustable with respect to the front section 12 to accommodate any size standard litter box.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An adjustable cat litter box accessory for removing and collecting excess cat litter from a cat's paws comprising, in combination:

a front section comprising a peripheral wall, the peripheral wall forming a rounded closed forward wall and an open rear wall, the rounded closed forward wall having an arcuate slotted opening formed therethrough, the front section further comprising a forward portion and a rearward portion, the forward portion being formed within the rounded closed forward wall and having a closed interior rear wall, the closed interior rear wall having a central opening therethrough, the rearward portion having a platform extending between the closed interior rear wall of the forward portion and the open rear wall, the rearward portion having a pair of lower channels extending inwardly thereof and a pair of side channels extending inwardly thereof;

a rear section slidably coupled with respect to the open rear wall of the front section, the rear section comprising an open front end, a closed rear end, opposed side walls, and a closed bottom, the opposed side walls slidably received within the pair of side channels of the rearward portion of the front section, the closed bottom having an elevated bifurcated bracket slidably received within the pair of lower channels of the rearward portion of the front section;

a removable grill dimensioned for coupling with the forward portion of the front section, the grill being defined by a plurality of upwardly raising nubs and a plurality of oblong apertures therethrough, the removable grill having a plurality of legs extending from a lower surface thereof for elevating the grill within the forward portion; and a removable collection tray dimensioned for slidable receipt within the arcuate slotted opening in the rounded closed forward wall of the front section, the collection tray being positioned below the removable grill within the forward portion of the front section, the collection tray having a handle extending outwardly therefrom.

2. An adjustable cat litter box accessory for removing and collecting excess cat litter from a cat's paws comprising, in combination:

a front section comprising a peripheral wall, the peripheral wall forming a rounded closed forward wall and an open rear wall;

a rear section slidably coupled with respect to the open rear wall of the front section;

a removable grill dimensioned for coupling with the front section; and a removable collection tray dimensioned for slidable receipt within an opening in the rounded closed forward wall of the front section, the collection tray being positioned below the removable grill within the front section.

3. The adjustable cat litter box accessory as set forth in claim 2 wherein the front section includes a rearward portion having a pair of lower channels extending inwardly thereof and a pair of side channels extending inwardly thereof, the rear section includes opposed side walls slidably received within the pair of side channels, the rear section having an elevated bifurcated bracket slidably received within the pair of lower channels.

4. The adjustable cat litter box as set forth in claim 2 wherein the removable grill is defined by a plurality of upwardly raising nubs and a plurality of oblong apertures therethrough.

5. The adjustable cat litter box as set forth in claim 2 wherein the removable grill has a plurality of legs extending from a lower surface thereof for elevating the grill within the front section.

6. The adjustable cat litter box as set forth in claim 2 wherein the collection tray has a handle extending outwardly therefrom.

7. A cat litter box accessory for removing and collecting excess cat litter from a cat's paws comprising:

a front section comprising a peripheral wall, the peripheral wall forming a forward wall and a parallel rearward wall and parallel side walls therebetween and with an opening in the forward wall;

a rear section coupled with respect to the rear wall of the front section;

a grill horizontally positioned within the front section; and a removable collection tray dimensioned for slidable receipt within the opening in the forward wall of the front section, the collection tray being positioned below the grill within the front selection during operation and use.

* * * * *